No. 867,886. PATENTED OCT. 8, 1907.
J. KRINER.
HOOK.
APPLICATION FILED APR. 3, 1907.
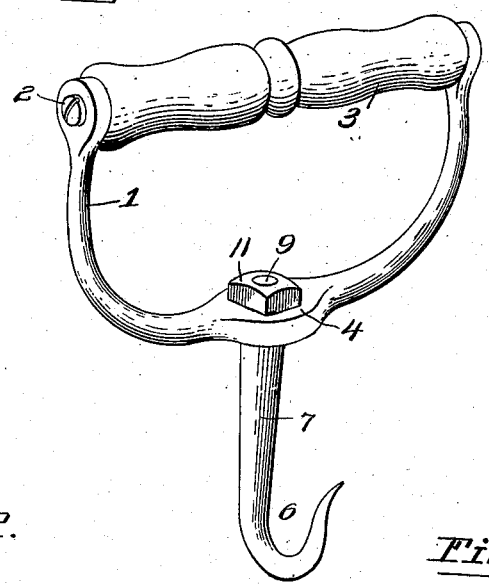
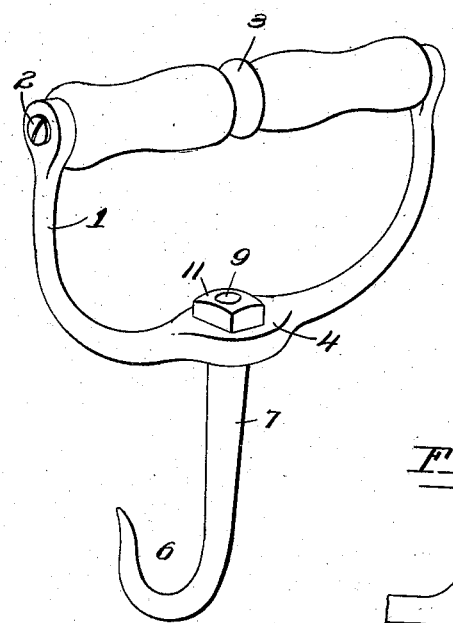
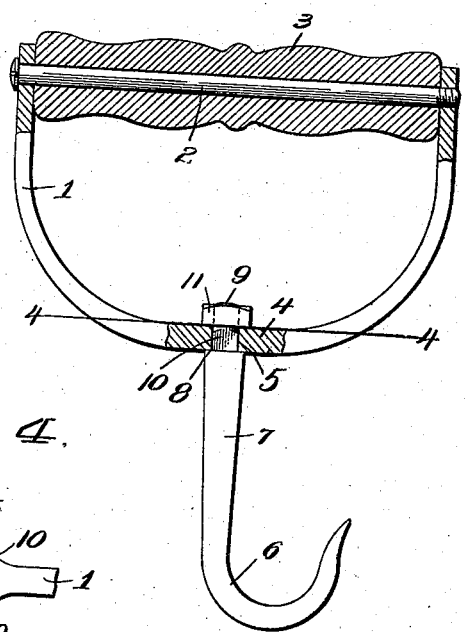
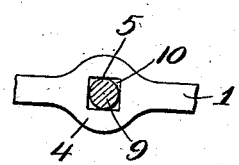
Inventor
Jeremiah Kriner
Witnesses
F. C. Gibson
C. C. Hines
By Victor J. Evans
Attorney

UNITED STATES PATENT OFFICE.

JEREMIAH KRINER, OF CARLISLE SPRINGS, PENNSYLVANIA.

HOOK.

No. 867,886.　　　　Specification of Letters Patent.　　　　Patented Oct. 8, 1907.

Application filed April 3, 1907. Serial No. 366,217.

*To all whom it may concern:*

Be it known that I, JEREMIAH KRINER, a citizen of the United States of America, residing at Carlisle Springs, in the county of Cumberland and State of Pennsylvania, have invented new and useful Improvements in Hooks, of which the following is a specification.

This invention relates to improvements in grappling hooks, designed to be used for lifting kettles, lifting and handling bales of cotton, hay and other material, and for general uses in different arts for various purposes.

The object of the invention is to provide a construction by which the hook proper may be detachably fastened to its handle, to enable a variety of interchangeable hooks to be used in conjunction therewith, and further to provide a construction in which the hook proper is adjustably connected with the handle, so that it may be set at an angle thereto at any point in a circular plane for great convenience in manipulating the hook and lifting or transporting different objects.

The preferred embodiment of the invention is illustrated in the accompanying drawings, in which:—

Figure 1 is a perspective view of the hook, showing the hook member proper adjusted to lie at right angles to the handle. Fig. 2 is a similar view showing the hook member adjusted to project in one direction and lie in the plane of the handle. Fig. 3 is a sectional elevation, showing the hook adjusted to project reversely to its position in Fig. 2. Fig. 4 is a section on line 4—4 of Fig. 3.

Referring to Figs. 1 to 4, inclusive, the numeral 1 designates a bail-shaped handle bar, the arms of which are connected at their upper or free ends by a tie bolt 2, on which is mounted a grip 3. The central portion of the base of the bar 1 is centrally enlarged, as at 4, and provided with a square or non-circular socket 5. The hook proper 6 has a shank 7 formed at its upper end with a bearing shoulder 8 and terminating in a threaded circular stem 9. Between the shoulder 8 and stem 9 the shank is formed with an angular or non-circular portion 10 adapted to fit within the socket or opening 5.

When the portion 10 is fitted in the opening 5, the shoulder 8 bears against the underside of the portion 4 and holds the hook from upward movement, while the angular surfaces of the opening and portion 10 hold the hook from rotation. The threaded stem 9 projects above the portion 4 and receives a nut 11, by which the hook member is detachably clamped in position. Upon detaching the nut the hook may be moved downward until its circular stem lies in the opening 5, turned to lie at any one of a variety of angles to the handle, depending upon the number of sides of the angular surfaces, and again applied in position and clamped by the nut 11. The hook may accordingly be disposed in a convenient manner at different angles to the handle to best suit the character of work being done. The construction described also permits of the ready application and use of a variety of interchangeable hooks of different sizes and constructions.

In the form shown in Fig. 6, the opening in the bail handle bar, here denoted $5^a$, is circular, and the shank of the hook is provided above its shoulder 8 with a continuous circular threaded stem $9^a$ adapted to project upwardly through said opening and to receive a clamping nut $11^a$. The wall of the opening is preferably threaded to enable the hook proper to be conveniently adjusted and to secure a dual fastening connection.

In the modification shown in Figs. 8, 9 and 10 a circular opening $5^b$ is provided in the handle, and at the base of this opening is formed a semicircular recess $5^c$, while the hook $6^a$ is provided with an eye 12 engaging the eye of an eye bolt 13, the stem of which is adapted to project upward through the opening $5^b$ and to receive a clamping nut 14. When drawn upward the eye bolt seats in the circular recess $5^c$ and is thus caused to bind tightly against the handle. It will be seen that in this construction the hook proper is pivotally mounted upon the handle, and may be adjusted in an obvious manner to lie at different angles thereto, as in the other constructions.

Having thus described the invention, what is claimed as new, is:—

A device of the character described comprising a bail handle having an enlargement provided with a non-circular opening, a hook having a shoulder to bear against the underside of the enlargement, a non-circular portion to fit within the opening, and a threaded stem projecting above said non-circular opening, and a nut for engaging said stem and bearing against the upper side of the enlargement to draw said shoulder against the underside of said enlargement and thereby clamp the hook in position.

In testimony whereof, I affix my signature in presence of two witnesses.

JEREMIAH KRINER.

Witnesses:
　VIOLA B. COOPER,
　HERMAN BERG, Jr.